United States Patent [19]

Wu et al.

[11] Patent Number: 5,625,498

[45] Date of Patent: Apr. 29, 1997

[54] LENS ASSEMBLY FOR OPTICAL SCANNERS

[76] Inventors: Wen-Ching Wu, 3F, No. 40, Alley 20, Lane 124, Chiao Chung 1st Street, Panchiao City, Taipei Hsien; Wu-Chung Lin, 4F, No. 31, Yung Chen Rd., Yung Ho City, Taipei Hsien, both of Taiwan

[21] Appl. No.: 517,966

[22] Filed: Aug. 22, 1995

[51] Int. Cl.⁶ .................................................. G02B 7/02
[52] U.S. Cl. .................. 359/811; 359/808; 359/827; 359/798; 250/208.1; 250/578.1; 396/108
[58] Field of Search .......................... 359/827, 798, 359/799, 800, 808, 811, 812; 354/481, 485; 352/227, 232, 236, 248; 250/208.1, 578.1

[56] References Cited

U.S. PATENT DOCUMENTS

| | | | |
|---|---|---|---|
| 5,132,849 | 7/1992 | Cordes | 359/798 |
| 5,260,813 | 11/1993 | Sato et al. | 250/578.1 |
| 5,283,425 | 2/1994 | Imamura | 250/208.1 |
| 5,406,065 | 4/1995 | Jacksen | 250/208.1 |
| 5,412,509 | 5/1995 | Nakata et al. | 359/811 |

*Primary Examiner*—Loha Ben

[57] ABSTRACT

A lens assembly including a printed circuit board having a longitudinal series of light emitting diodes, a casing mounted on the printed circuit board and covered over the light emitting diodes and having a glass cover, and a lens having a bottom side mounted on the glass cover, a plane top surface, and a sand finished, peripheral surface which confines the light of the LEDs to the plane top surface of the lens.

1 Claim, 4 Drawing Sheets

LENS ASSEMBLY FOR OPTICAL SCANNERS

BACKGROUND OF THE INVENTION

The present invention relates to a lens assembly for optical scanners which greatly improves the effective area of illumination.

FIGS. 1(a) and 1(b) show a lens assembly for optical scanners according to the prior art in which the lens which condenses the light of the light emitting diode array onto a document has a convex top surface. When the lens assembly is installed, the distance between an object and the convex top surface of the lens is maintained at about 6 mm, and the effective area of illumination ΔL is about 1.8-2.0 mm. Because of limited effective area of illumination, the adjustment of the optical mechanism is important during the manufacturing of fax machines, scanners, contact image sensors. However, because the adjustment of the optical mechanism is complicated, the manufacturing cost of the fax machines, scanners, contact image sensors is relatively increased.

SUMMARY OF THE INVENTION

It is one object of the present invention to provide a lens assembly which greatly improves the effective area of illumination. It is another object of the present invention to provide a lens assembly which greatly reduces the manufacturing cost of the fax machines, scanners, and contact image sensors. According to the preferred embodiment of the present invention, the lens assembly comprises a printed circuit board having a longitudinal series of light emitting diodes, a casing mounted on the printed circuit board and covered over the light emitting diodes and having a glass cover, and a lens having a bottom side mounted on the glass cover, a plane top surface, and a sand finished, figured peripheral surface which confines the light of the LEDs to the plane top surface of the lens.

DETAILED DESCRIPTION OF THE PREFERRED EMBODIMENT

Figure 1B:
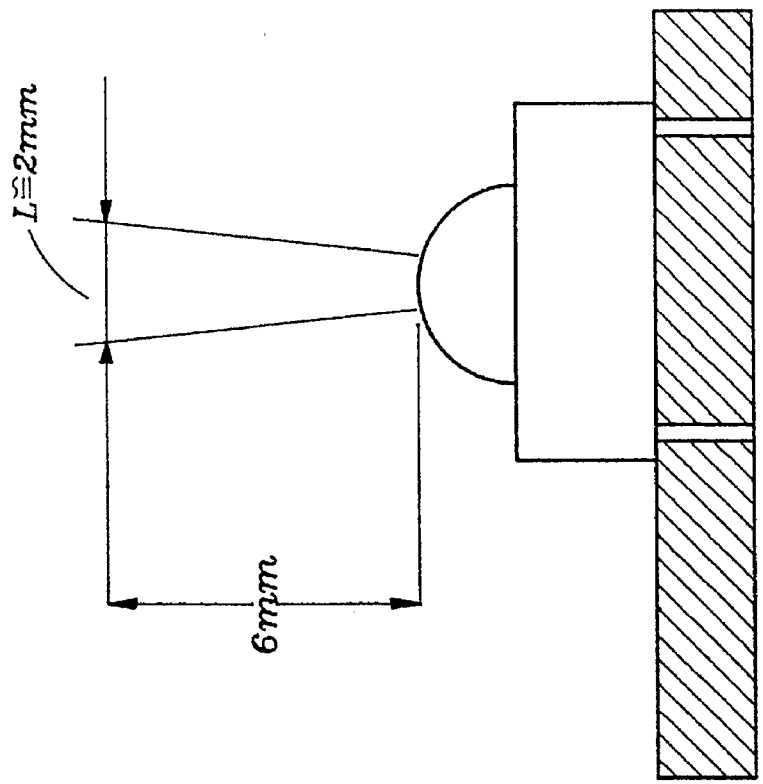
FIGS. 1(a) and 1(b) show the structure of the effective area of illumination of a prior art lens assembly.
Figure 1A:
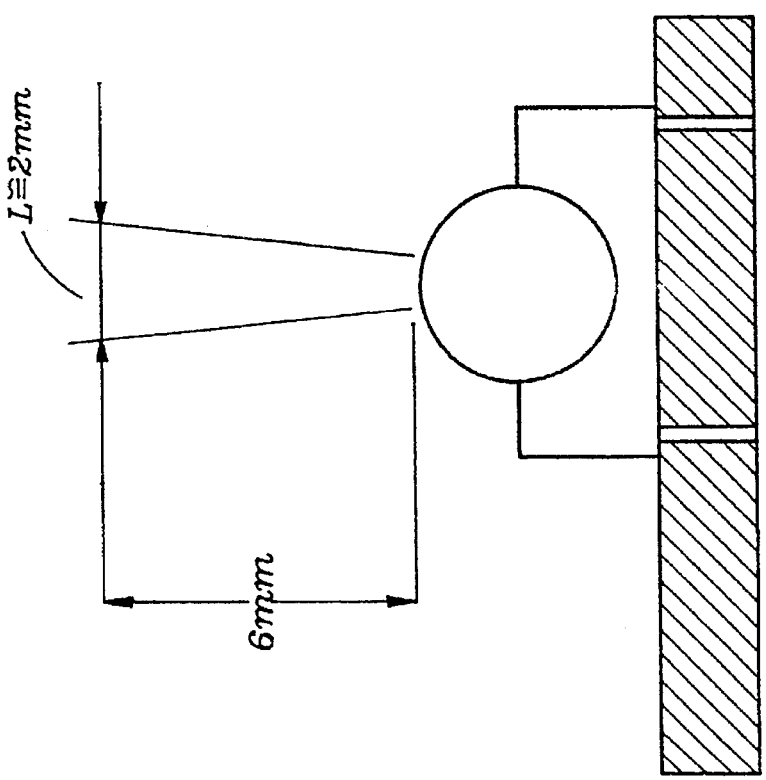
Figure 2:
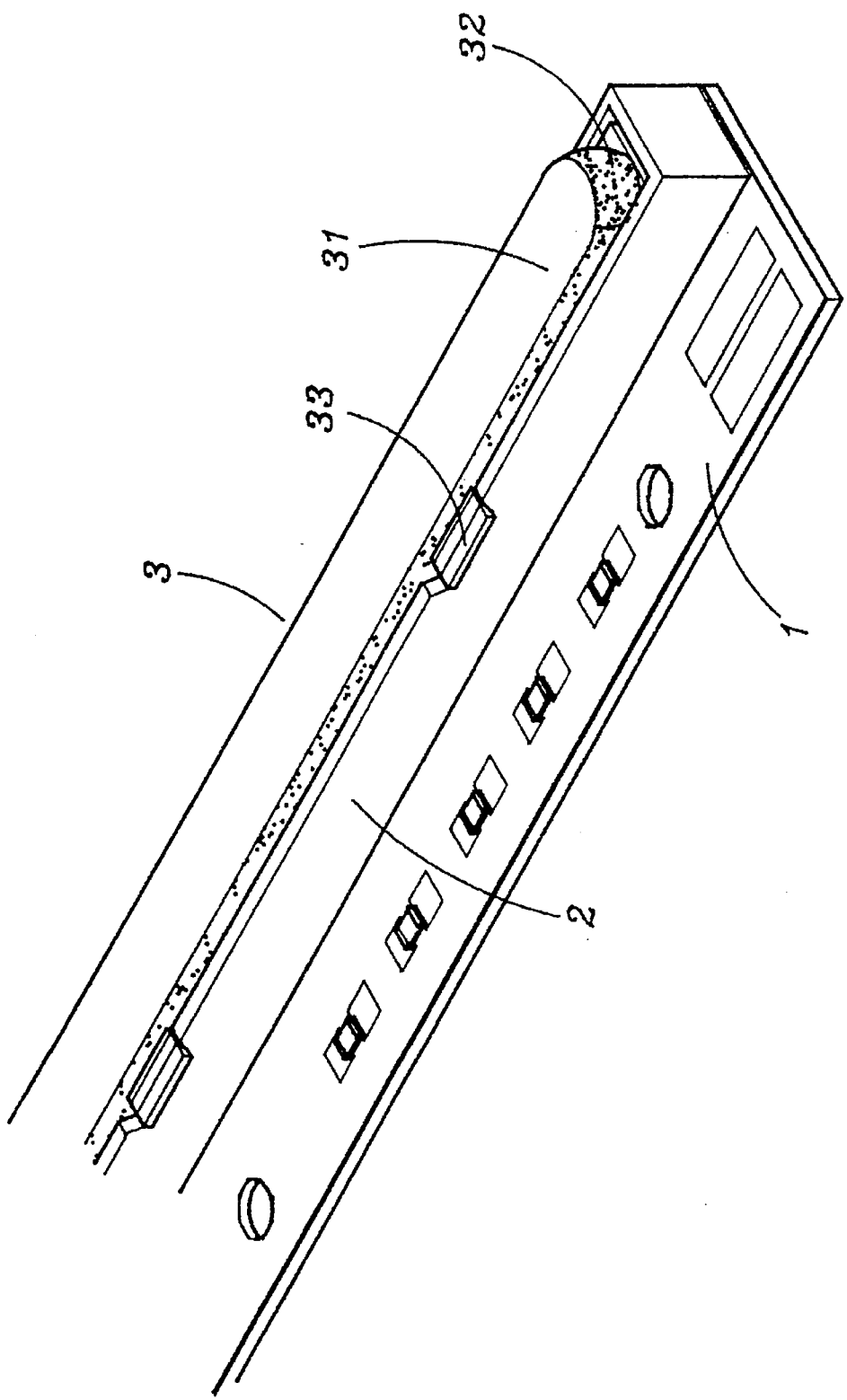
FIG. 2 is an elevational view of a lens assembly according to the present invention.
Figure 3:
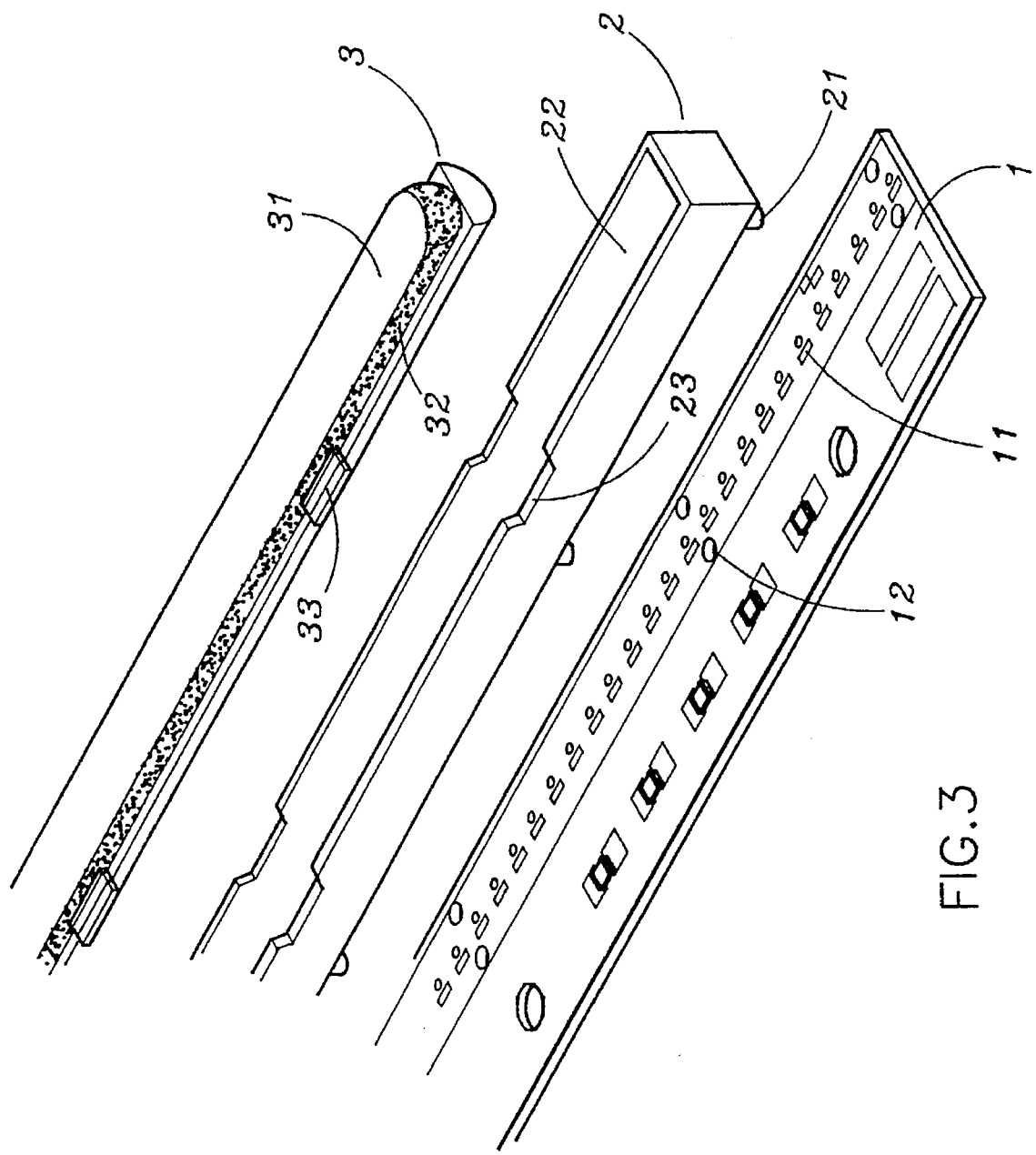
FIG. 3 is an exploded view of the lens assembly shown in FIG. 2.

Referring to FIGS. 2 and 3, a lens assembly for optical scanners in accordance with the present invention is generally comprised of a lens 3, a casing 2, and a PCB (printed circuit board). The circuit board 1 comprises a longitudinal series of LEDs (light emitting diodes) 11 in the middle, and two longitudinal rows of locating holes 12 at two opposite sides. The casing 2 comprises two longitudinal rows of bottom pins 21 respectively fitted into the locating holes 12 of the PCB 1, and a glass cover 22 at the top side. The glass cover 22 has a plurality of mounting notches 23 longitudinally and symmetrically disposed at two opposite sides. The lens 3 is mounted on the glass cover 22, having a plane top surface 31 remote from the glass cover 22 of the casing 2, a sand finished, figured peripheral surface 32, and a plurality of projecting portions 33 at two opposite sides respectively fitted into the mounting notches 23 of the glass cover 22.

Figure 4B:
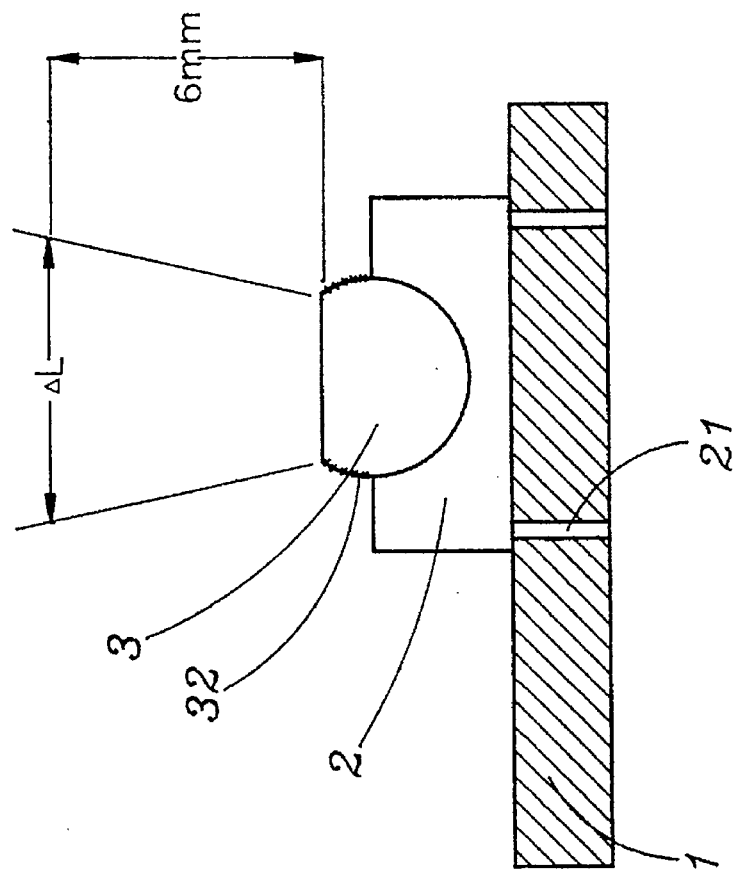
FIGS. 4(a) and 4(b) are plain sectional views of the lens assembly according to the present invention.
Figure 4A:
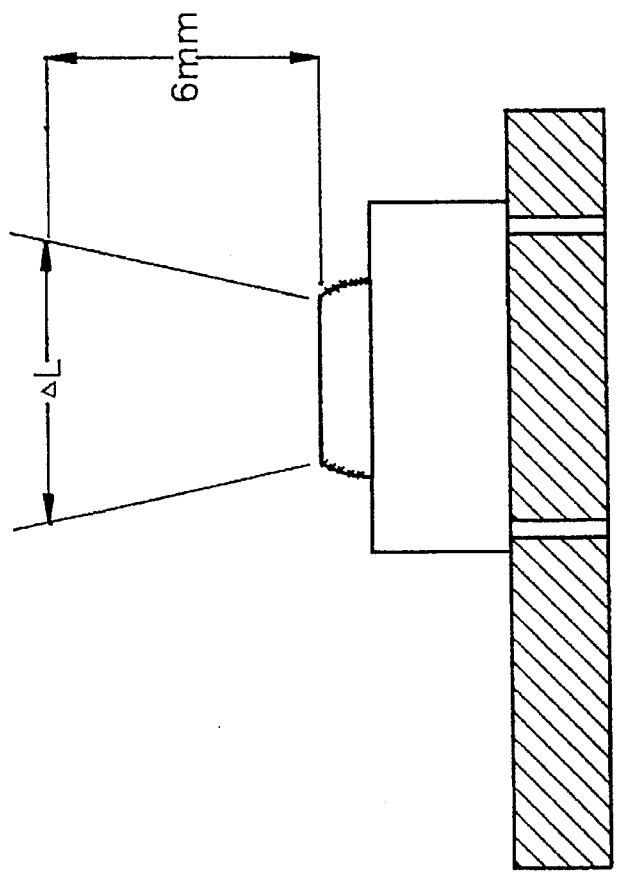

Because the sand finished, figured peripheral surface 32 is opaque of low light permeability, the light of the LEDs 11 is confined to the plane top surface 31 of the lens 3. Therefore, the effective area of illumination ΔL can be increased by widening the width of the plane top surface 32 of the lens 3, noting FIGS. 4(a) and 4(b). By means of the application of the present invention in fax machines, scanners, contact image sensors, etc., less mechanism adjustment is required. Therefore, the manufacturing process of the fax machines, scanners, contact image sensors, etc., is simplified.

As indicated, the present invention achieves the following advantages:

1. The design of the sand finished, figured peripheral surface of the lens confines the light of the LEDs to the plane top surface, therefore the effective area of illumination is improved, and the design of the fax machines, scanners, contact image sensors, etc., become easy.

2. The sand finished, figured peripheral surface of the lens reduces the amount of the leakage of light, and concentrates the light of the LEDs onto the document through the plane top surface of the lens, and therefore sufficient intensity of light can be obtained when the plane top surface of the lens is disposed at a distance of 6 mm from the document.

3. The effective area of illumination can be adjusted by changing the width of the top plane surface of the lens.

It is to be understood that the drawings are designed for purposes of illustration only, and are not intended as a definition of the limits and scope of the invention disclosed.

We claim:

1. A lens assembly comprising a printed circuit board having a longitudinal series of light emitting diodes, a casing mounted on said printed circuit board and covered over said light emitting diodes and having a glass cover, and a lens mounted on said glass cover for transmitting the light of said light emitting diodes onto an object wherein said lens has a plane top surface remote from said glass cover of said casing, and a sand finished, figured peripheral surface.

* * * * *

UNITED STATES PATENT AND TRADEMARK OFFICE
CERTIFICATE OF CORRECTION

PATENT NO. : 5,625,498
DATED : April 29, 1997
INVENTOR(S) : Wen-Ching WU et al.

It is certified that error appears in the above-identified patent and that said Letters Patent is hereby corrected as shown below:

Cover page, column 1, between lines [76] and [21] insert the following:

--Assignee: TAIWAN LITON ELECTRONIC CO., LTD.
    Taipei, Taiwan,    --

Signed and Sealed this

Nineteenth Day of May, 1998

Attest:

BRUCE LEHMAN

Attesting Officer    Commissioner of Patents and Trademarks